(12) United States Patent
Di Nardo et al.

(10) Patent No.: US 10,533,834 B2
(45) Date of Patent: Jan. 14, 2020

(54) ICE SKATE BLADE MEASURING APPARATUS

(71) Applicant: Mayflower Industries, LLC, Kay Largo, FL (US)

(72) Inventors: Thomas Di Nardo, Key Largo, FL (US); Christopher Needham, Midvale, UT (US); Michael Gomm, Provo, UT (US); Chris Lauridsen, Provo, UT (US)

( * ) Notice: Subject to any disclaimer, the term of this patent is extended or adjusted under 35 U.S.C. 154(b) by 0 days.

(21) Appl. No.: 16/344,324

(22) PCT Filed: Oct. 24, 2017

(86) PCT No.: PCT/US2017/058065
§ 371 (c)(1),
(2) Date: Apr. 23, 2019

(87) PCT Pub. No.: WO2018/081104
PCT Pub. Date: May 3, 2018

(65) Prior Publication Data
US 2019/0265013 A1    Aug. 29, 2019

Related U.S. Application Data

(60) Provisional application No. 62/412,097, filed on Oct. 24, 2016.

(51) Int. Cl.
| | |
|---|---|
| *G01B 5/213* | (2006.01) |
| *A63C 3/00* | (2006.01) |
| *G01B 5/00* | (2006.01) |
| *A63C 1/32* | (2006.01) |

(Continued)

(52) U.S. Cl.
CPC .......... *G01B 5/213* (2013.01); *A63C 1/32* (2013.01); *A63C 1/38* (2013.01); *A63C 1/40* (2013.01); *A63C 3/00* (2013.01); *G01B 5/0004* (2013.01); *G01B 5/0023* (2013.01); *A63C 2203/18* (2013.01)

(58) Field of Classification Search
CPC ........ G01B 5/213; G01B 5/0023; G01B 5/20; A63C 1/30
USPC ........................................ 33/573, 535, 533
See application file for complete search history.

(56) References Cited

U.S. PATENT DOCUMENTS

| | | | | |
|---|---|---|---|---|
| 4,161,822 A | * | 7/1979 | Ayvazian | A63C 3/10 280/809 |
| 5,345,688 A | * | 9/1994 | Allen | A63C 3/00 280/809 |

(Continued)

OTHER PUBLICATIONS

"Magnitic Radius Gauge". Carbotechnix. Oct. 15, 2016 (Oct. 15, 2016) Retrieved from https://web.archive.org/web/20161015192636/ http://carbotechnix.com.pl/english.html. Entire document especially p. 1, top row of images, paragraph 1. (Year: 2016).*

*Primary Examiner* — Christopher W Fulton
(74) *Attorney, Agent, or Firm* — Dobbin IP Law P.C.; Geoffrey E. Dobbin (57) ABSTRACT

A blade measuring apparatus (21) to measure the radius and bend of skate blades along the longitudinal plane of the skate blade runner features a one-piece frame (1), thermally non-conductive handles (5), and adjustable, replaceable, and interchangeable magnetic force application components (9, 10) and assemblies.

7 Claims, 6 Drawing Sheets

(51) Int. Cl.
*A63C 1/40* (2006.01)
*A63C 1/38* (2006.01)

(56) References Cited

U.S. PATENT DOCUMENTS

| | | | | | |
|---|---|---|---|---|---|
| 5,547,416 | A | * | 8/1996 | Timms | A63C 3/10 |
| | | | | | 451/193 |
| 6,481,113 | B1 | * | 11/2002 | Brenner | A63C 3/00 |
| | | | | | 280/809 |
| 7,191,539 | B2 | * | 3/2007 | Zukerman | A63C 3/10 |
| | | | | | 280/809 |
| 7,434,324 | B2 | * | 10/2008 | McKenna | A63C 3/10 |
| | | | | | 33/474 |
| 7,918,035 | B1 | * | 4/2011 | Jarczewski | A63C 3/10 |
| | | | | | 280/809 |
| 2017/0191817 | A1 | * | 7/2017 | Layton, Jr. | G01B 5/28 |

* cited by examiner

ICE SKATE BLADE MEASURING APPARATUS

CROSS REFERENCES TO RELATED APPLICATIONS

The present application claims priority as a national phase entry under 35 U.S.C. § 371 of PCT Application number PCT/US2017/058065, which in turn claims priority to U.S. Provisional Application No. 62/412,097, filed Oct. 24, 2016. This Application incorporates both prior Applications by reference herein in its entirety.

FIELD OF THE INVENTION

The invention discussed herein relates to the general field of ice-skating accessories and describes a skate blade measuring device.

BACKGROUND OF THE INVENTION

The curved speed skate blade was first discussed in U.S. Pat. No. 5,320,368 (1994) to Ling. The patent discusses some of the advantages with longitudinal side bending of speed skating blades, including combinations of radius and bend for speed skating blades in said patent.

Figure 1:
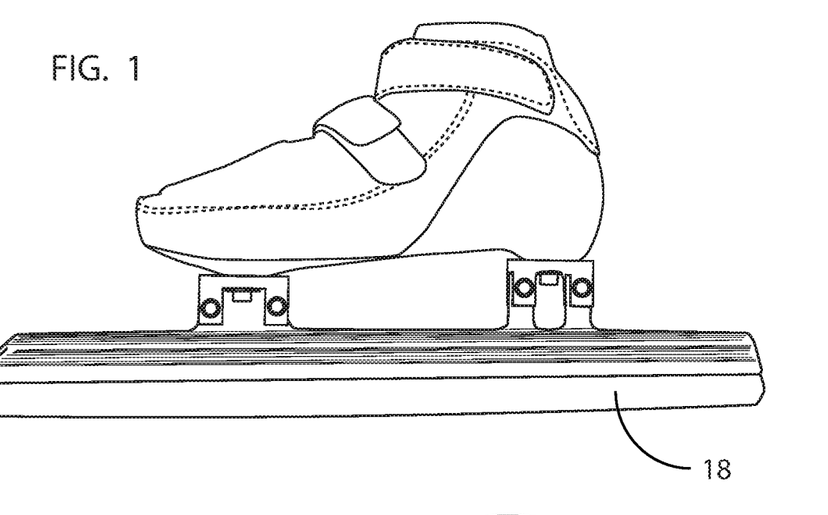
FIG. 1 is a side view of a short track speed skate.
Figure 2A:
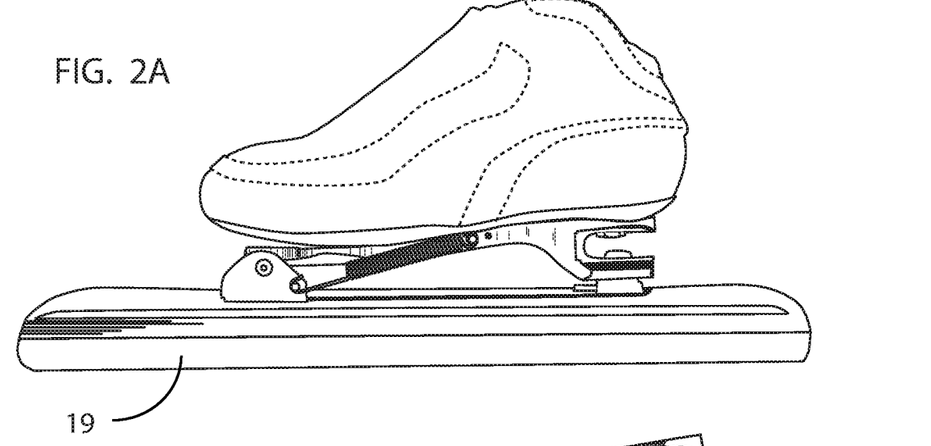
FIG. 2A is a side view of a long track speed skate illustrating the hinged "clap arm" mechanism which is affixed to the forefoot area of the boot.
Figure 2B:
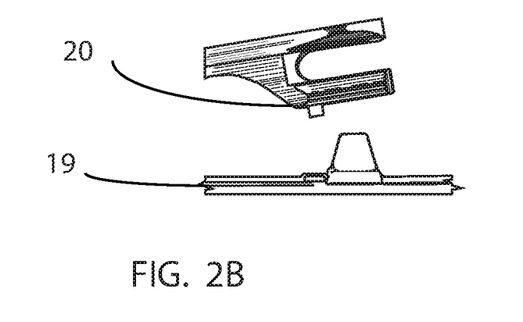
FIG. 2B is a side view of a long track speed skate illustrating the movement of the hinged "clap arm" mechanism.

Speed skating blades are generally manufactured with an aluminum or steel longitudinal tubular structure, into which a steel blade is mounted on one side of the tube, and aluminum mounting "cups" or "arms" are attached to the opposite side of the tube to allow for the mounting and adjustment of a boot. There are two general types of speed skating blades, one being designated for short track skating on a 111 m skating track, and the other for long track skating on a 400 m skating track. The short track blades are designed to be mounted in a fixed position at the forefoot and heel of the boot as shown in FIG. 1. The mounts used on the short track blades may be changed for different heights to increase or decrease the distance between the boot and the blade depending on the preference of the skater. The most popular long track blades are designed to be mounted in a fixed position in the forefoot of the blade on a hinged arm that is not fixed to the heel of the boot, as shown in FIG. 2A. This is commonly referred to as a "clap skate" after the clapping sound that occurs when the hinge closes while skating. FIG. 2B illustrates the movement of the clap arm (20). This design allows for longer contact with the ice and more speed to be generated by the skater. The hinged clap arm design on the long track skate is not allowed to be used on a short track skate under regulation by the International Skating Union, the governing body for the sport.

Speed skate racing is generally performed with turns only in the counter-clockwise direction. To maximize stability and skating efficiency, skate boots and blades are typically configured to take advantage of the counter-clockwise turns. Blades are mounted on boots with an offset to the left, and some blades are positioned to the left in their support structure. The blade runner surface is also generally adjusted with a radius or "rocker" that complements the dimensions of the skating rink and the experience level of the skater. The radius applied to the blades for a beginning skater is normally a single radius, whereas expert level skaters might use a complex curve made of multiple radii varying over the length of the blade surface, also referred to as a compound radius. Typically, the chosen rocker is more curved at the heel and toe areas of the blade, and flatter toward the center of the blade. The center section of the blade tends to be more curved than the turn radius of the racing course.

In addition to applying a radius to the runner surface of the blade, the blades of expert skaters can be also bent to the left to take advantage of skating only in a counter-clockwise direction. For skaters using a compound radius, the bend applied to the blades can be varied according to the radius to increase the contact area of the blade with the surface of the ice, thereby increasing grip as well as allowing the skater to turn more sharply as they apply weight to that section of the blade. To illustrate this principle, for skaters who have a smaller radius applied to the toe and heel sections of their blades and a flatter radius in the center, when the blades are bent more in the toe and heel areas, as the skater applies more weight to the toe or heel sections of the blade, the blade will turn more quickly allowing the skater to change their trajectory more easily.

The bending of skate blades historically was done with a mallet, vise, or similar tool until the blade "looked right" or "felt right." The bending process was usually applied to the blade's tube, rather than the blade runner because the blade runner is more delicate, and the tube tends to retain the applied curve better. The toe of the blade may be bent so the blade turns more sharply when a skater's weight moves forward. The heel of the blade may be bent so the blade turns more sharply when the skater's weight moves back. The entire blade can be bent in a smooth arc for increased ice contact and stability, or it may have variable curvature to allow the skater to increase or decrease their turning efficiency depending on the portion of blade they apply pressure to. There was little predictability in this process when performed with mallets and vices, and as a result, skaters were often hesitant to skate on blades bent in this manner.

In the mid-1990's, in Australia, Dennis Pennington built a purpose-specific tool for blade bending. The Pennington Blade Bender brought with it a more predictable method of applying the bend to a blade. It allowed the user to apply pressure to a lever arm and flex a portion of the blade between two anvil-like surfaces. The anvils were permanently mounted in a sliding track and could be adjusted for width to increase or decrease the size of the area being bent. Attached to the lever-arm, mounted above the anvils, was a round disk with a radius on the edge, which is like the round surface of the blades tube holder. When the lever was pushed down, the presser disc was pressed against the blade's tube, and a bend in that section of the blade resulted. The more pressure that was applied to the lever arm, the more bend was applied to the blade. The benefits of the Pennington bender included easier repeatability of bending operations, more consistent bending results, the device was portable, and the device was relatively inexpensive. After the Pennington bender was released, additional bender designs were brought to market by various competitors.

When the application of more precise radius and bend to the skate blade began to become more standard in the industry, technicians began to utilize a measurement apparatus to validate that the desired radius and bend had been correctly applied to the blade's runner surface. As discussed by Lang in U.S. Pat. No. 5,320,368 (1994), the typical measuring device measures either blade radius or bend over a 3½-inch (8.9 cm) span according to a dial indicator showing height in $\frac{1}{1000}$-inch (0.0254 mm) increments.

There are several prior art filings for apparatuses for measuring squareness of the blade runner surface, including U.S. Pat. No. 5,345,688 A (1994), U.S. Pat. No. 5,547,416 A (1996), U.S. Pat. No. 6,481,113 B1 (2002), U.S. Pat. No. 7,434,324 B2 (2005) (also CA 2,763,023 C), U.S. Pat. No.

7,191,539 B2 (2005), U.S. Pat. No. 7,918,035 B1(2009). None of these apparatuses address the issue of measuring either radius or bend on the blade runner surfaces.

Public domain prior art for measurement apparatuses that are concerned with measuring the radius and bend on the blade runner surfaces include the Marchese radius gauge, the Maple Skate B.V. radius gauge, and the ING radius gauge.

The Marchese gauge has become the industry standard measuring apparatus and is used by most skate technicians. This gauge was developed by Paul Marchese and it can be used to measure both radius and bend on both Long Track and Short Track skate blades. The Marchese gauge's popularity has led to the adoption of utilizing a 4" span with a dial indicator showing height in $\frac{1}{1000}$-inch (0.254 mm) increments, and a tolerance of approximately +/−0.002" (0.508 mm)

The Maple gauge utilizes the same basic design as the Marchese gauge but with less costly components resulting in a lower degree of accuracy, but at a lower price it offered broader access to a measuring tool.

The ING gauge, developed by Ronald van de Ing, utilizes a narrower span of approximately 2⅜" (6.033 cm) and height measurement in 1 μm increments. This gauge also introduced the concept of using rare earth magnets in the gauge frame to aid the user in maintaining proper position of the gauge on the surface to be measured. This gauge's design limits the user to measuring Long Track blade radii above 16 meters since radii below that number will result in exceeding the dial indicators ability to measure height. The gauge is accurate with a tolerance of approximately +/−0.5 μm. Because this gauge uses a difference span distance, with a higher resolution dial indicator, it is more difficult to use because very minor changes to the radius will appear to the uneducated user to be very large changes. The design of the frame is such that the components are permanently attached and not replaceable when wear occurs. Because the rare earth magnets are permanently affixed to the frame, cleaning off steel debris that accumulates during use is very difficult. Such debris can affect the accuracy of the measurements if not removed. Further, because the magnets are installed in a position that is offset from the contact points on the frame, this design cannot be used for accurate measurement of a blade's bend as the blade runner will tend to deform when the magnet is applied.

All existing gauges utilize a dial indicator which measures the contact point height, an average height measurement across a distance between the contact points on the main body of the device. The closer the contact points are together, the more granular the resolution of the measurement becomes. Accordingly, there exists a need for an improved skate blade bending device.

SUMMARY OF THE INVENTION

In accordance with an embodiment of a skate blade measuring apparatus for measuring the radius and bend applied to a skate blade is presented herein. A skate blade, having a generally elongated configuration, defines a blade runner, which provides a contacting section for contacting a gliding surface such as ice, and a blade attachment section for attaching the blade to a skate boot. The skate blade also defines a blade longitudinal axis, a blade first side surface, and a blade second side surface. The measuring apparatus may feature a one-piece frame, a two-piece handle, four measurement location points, four removable and replaceable magnetic force generators, and a height measurement indicator attached to the frame for measuring the skate blade radius and bend in a direction generally perpendicular to the blade's longitudinal axis at a predetermined location. The magnetic force generators integrated within the frame design allows the user to obtain measurements more precisely along the longitudinal axis of the blade first side or second side. The blade handles attached to the frame allow measurements to be obtained without the higher temperature of the user's hands increasing the temperature of the frame and distorting the height measurements obtained.

The frame handles may be constructed of materials which have a propensity to not conduct heat and affixed in longitudinal locations which are positioned opposite the height measurement location. The handles may be secured by fasteners or friction fit but should be easily removable.

Accordingly, there are several advantages of one or more aspects to such a blade measuring apparatus, such as providing a blade measuring apparatus that provides an easy, convenient, and repeatable method to measure the radius and bend of skate blades of various shapes and configurations, all while not damaging the skate blades. Such an apparatus would be easily adjusted for measuring operations and user configuration preference, easily cleaned and maintained, and be easily transported with a more attractive appearance. Other advantages of one or more aspects will be apparent from a consideration of the drawings and ensuing description.

The more important features of the invention have thus been outlined in order that the more detailed description that follows may be better understood and in order that the present contribution to the art may better be appreciated. Additional features of the invention will be described hereinafter and will form the subject matter of the claims that follow.

Many aspects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in several ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

The various embodiments described herein are not intended to limit the invention to those embodiments described. On the contrary, the intent is to cover all possible alternatives, modifications, and equivalents as may be included within the spirit and scope of the invention as defined by the appended claims.

DRAWINGS—LIST OF REFERENCE NUMERALS

The following reference numerals are employed in the figures to indicate the associated elements of the embodiments depicted:

1. Main Body
2. Main Body Set Screw
3. Main Body Set Screw Hole
4. Main Body Handle Fastener Hole
5. Main Body Handle
6. Main Body Handle Fastener
7. Main Body Handle Hole
8. Blade Contact Point
9. Radius Magnet
10. Bend Magnet
11. Blade Contact Point Hole
12. Dial Indicator Mount Hole
13. Radius Magnet Alignment Slot
14. Bend Magnet Alignment Slot
15. Main Body Dial Indicator Centerline Marks
16. Main Body Recessed Area
17. Dial Indicator
18. Short Track Skate Blade
19. Long Track Skate Blade
20. Clap Skate Arm
21. Blade Measuring Apparatus

DETAILED DESCRIPTION OF THE PREFERRED EMBODIMENT

Figure 3:
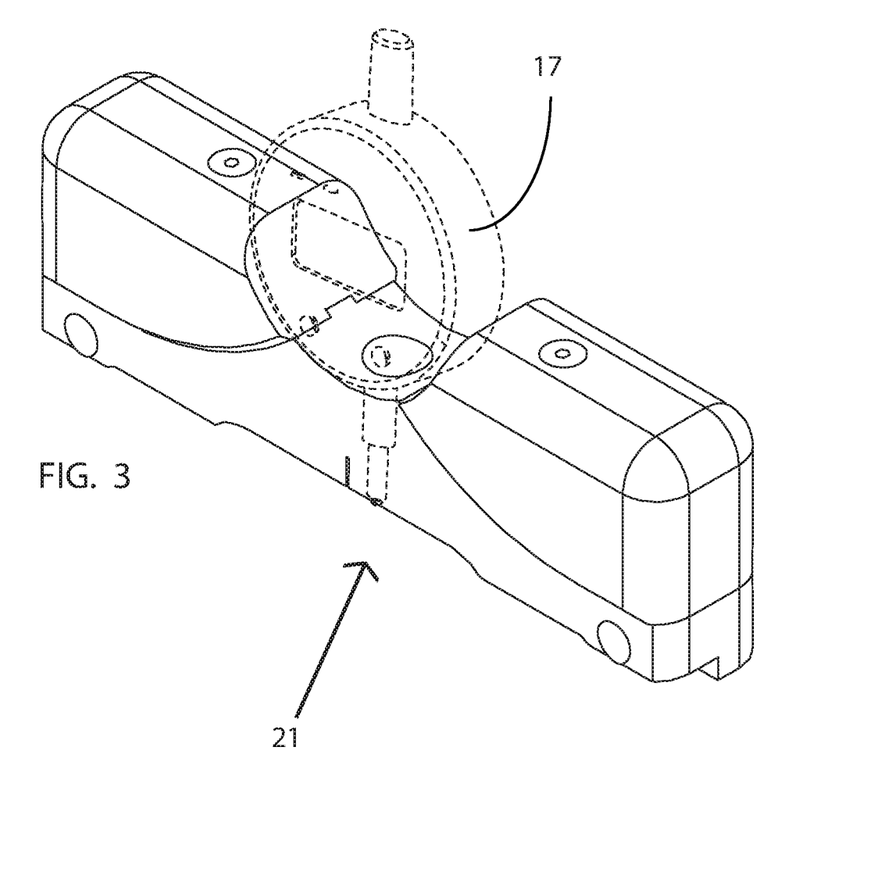
FIG. 3 is a perspective view of the front of a fully assembled skate blade measuring apparatus in accordance with an embodiment of the invention.

In FIG. 3, a front perspective view is shown of an embodiment of a blade measuring apparatus, with an associated dial indicator (17). The measuring apparatus can be used for measuring a short track skate blade (18) or a long track skate blade (19), examples of which are shown in FIGS. 1 and 2A. The skate blades (18) and (19) are generally configured as an elongated rail-type support, which is typically a cylindrical tube shape with appendages to facilitate mounting of a blade runner component and mounting points for affixing boots, commonly referred to as a blade tube. The blade tube generally has a slot adapted to hold and retain the upper portion of the blade or runner on one side of the blade tube, and mounting platform(s) referred to as "cups" or "arms" attached on the opposite side of the blade tube for attaching the blade assembly to boots. The short track blade (18) and long track blade (19) shown in FIGS. 1 and 2A exemplify one possible embodiment of each type of skate blade bendable with the blade bending apparatus. Various other types of skate blades, including blades of various configurations, may be used without departing from the scope of the present invention. Additionally, blade attachment sections with and without the associated runner or attachment components installed can also be used without departing from the scope of the present invention.

Figure 4:
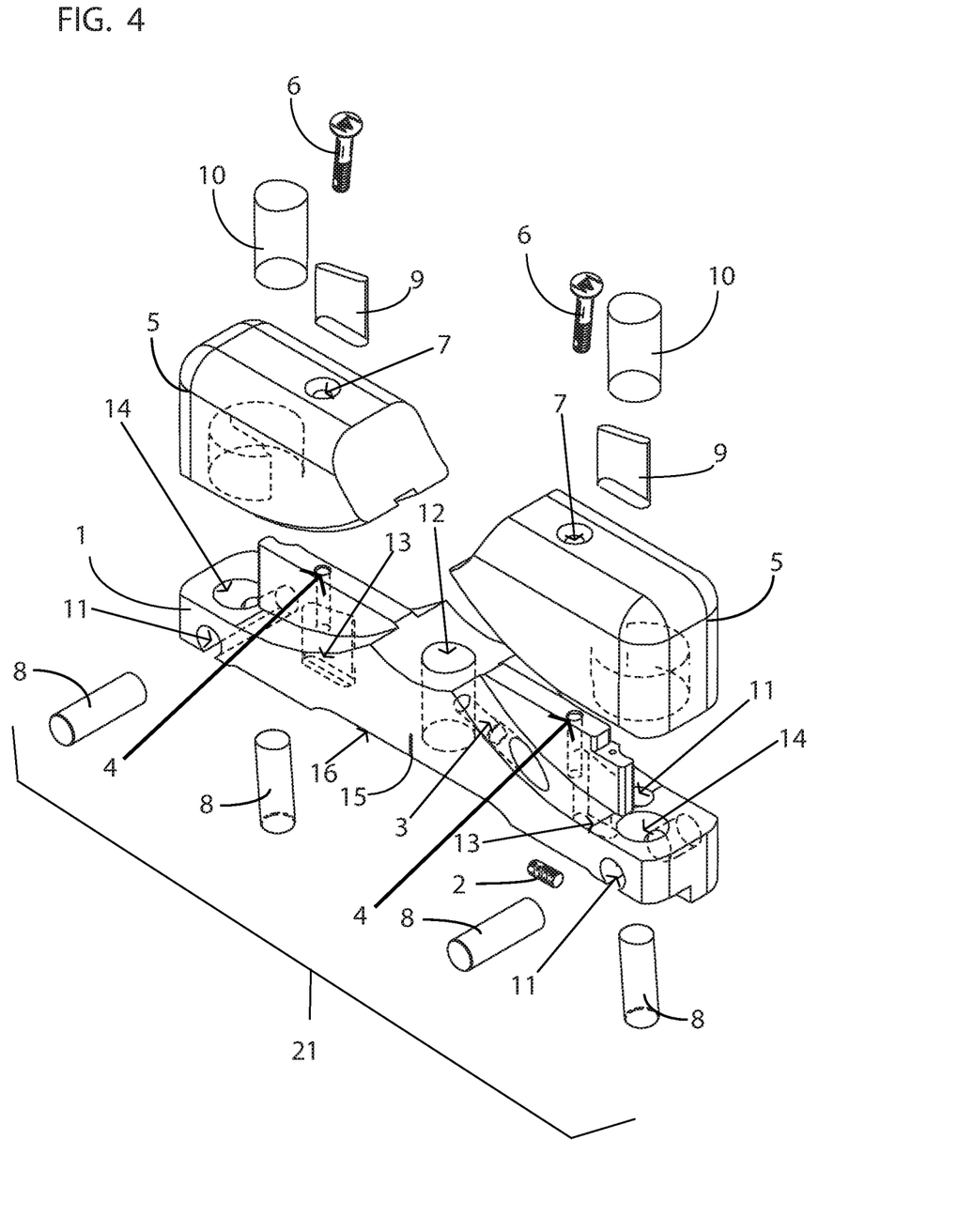
FIG. 4 is an exploded front perspective view of a skate blade measuring apparatus in accordance with an embodiment of the invention.
Figure 5:
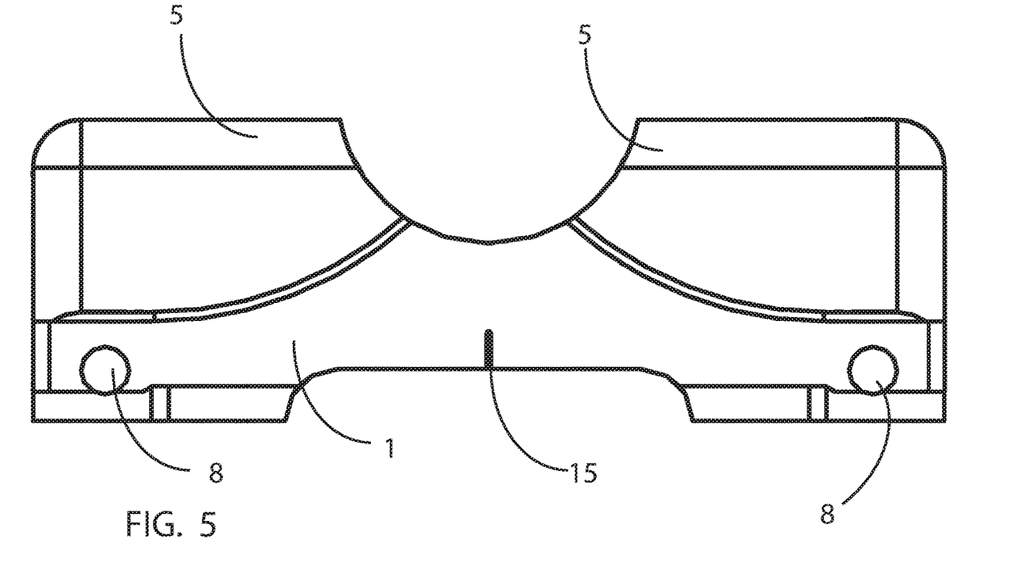
FIG. 5 is a front elevation of a fully assembled skate blade measuring apparatus in accordance with an embodiment of the invention.
Figure 6:
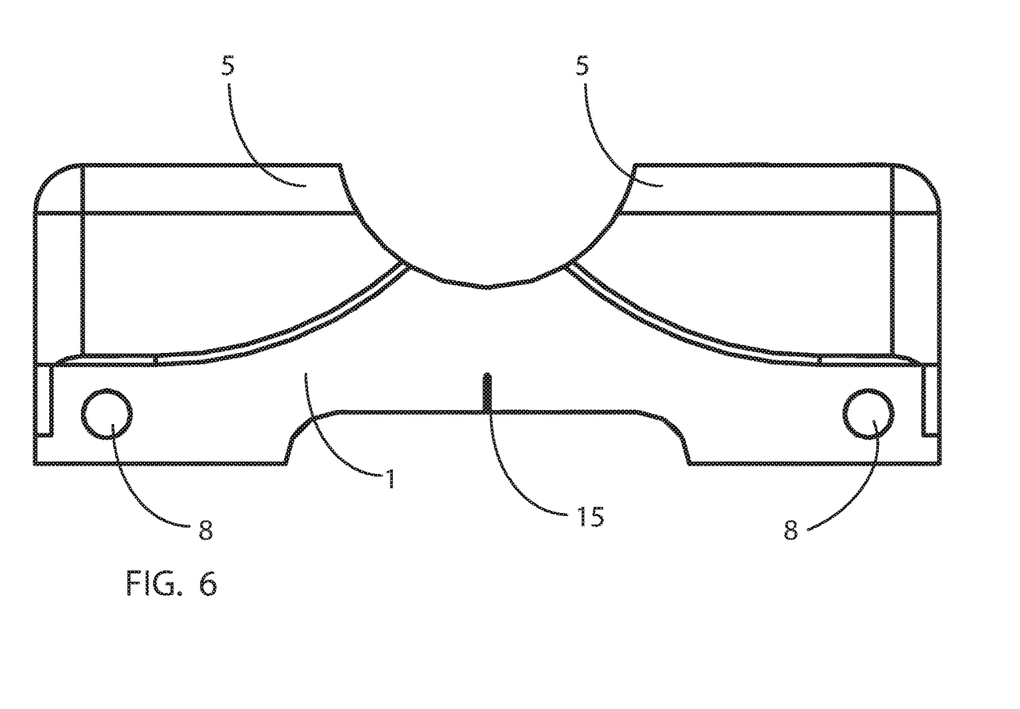
FIG. 6 is a rear elevation of a fully assembled skate blade measuring apparatus in accordance with an embodiment of the invention.
Figure 7:
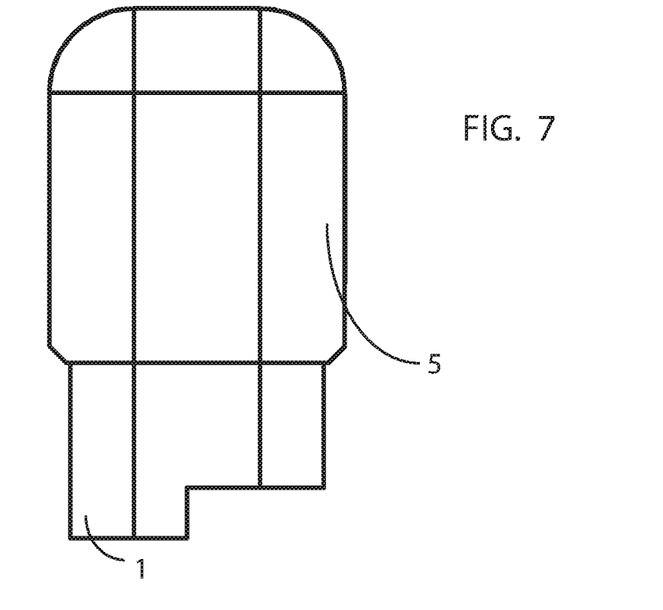
FIG. 7 is a left elevation of a fully assembled skate blade measuring apparatus in accordance with an embodiment of the invention.
Figure 8:
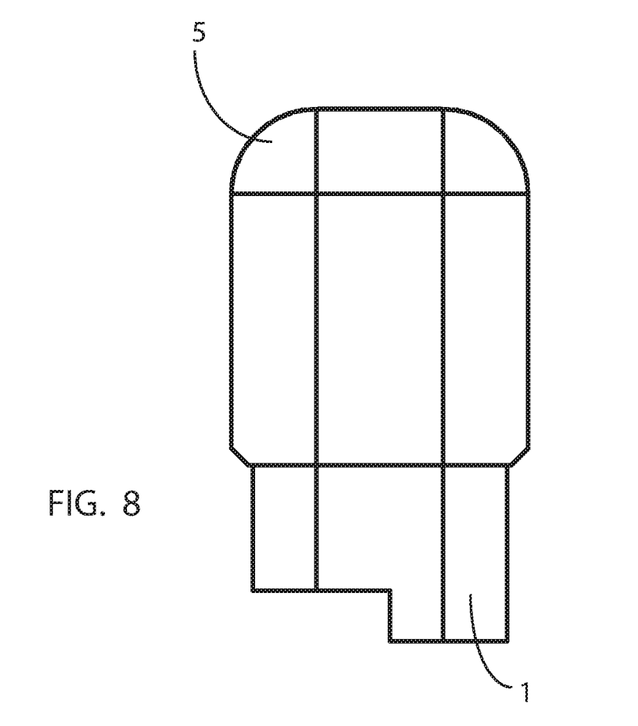
FIG. 8 is a right elevation of a fully assembled skate blade measuring apparatus in accordance with an embodiment of the invention.
Figure 9:
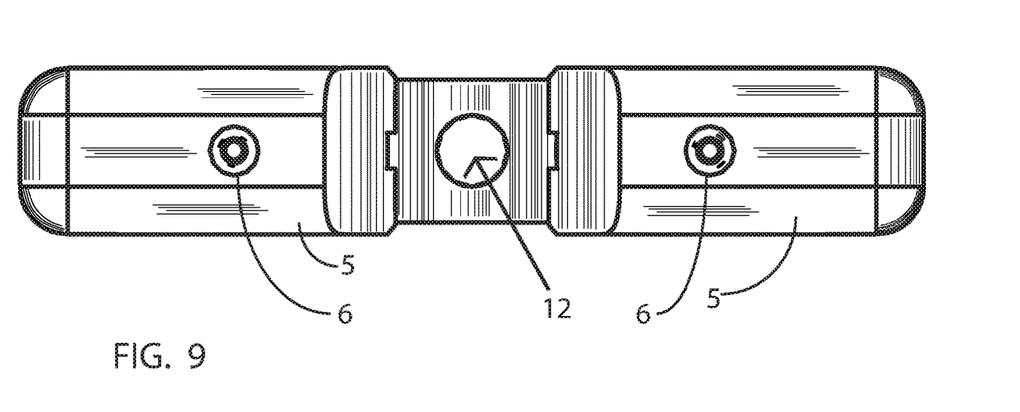
FIG. 9 is a top view of a fully assembled skate blade measuring apparatus in accordance with an embodiment of the invention.
Figure 10:
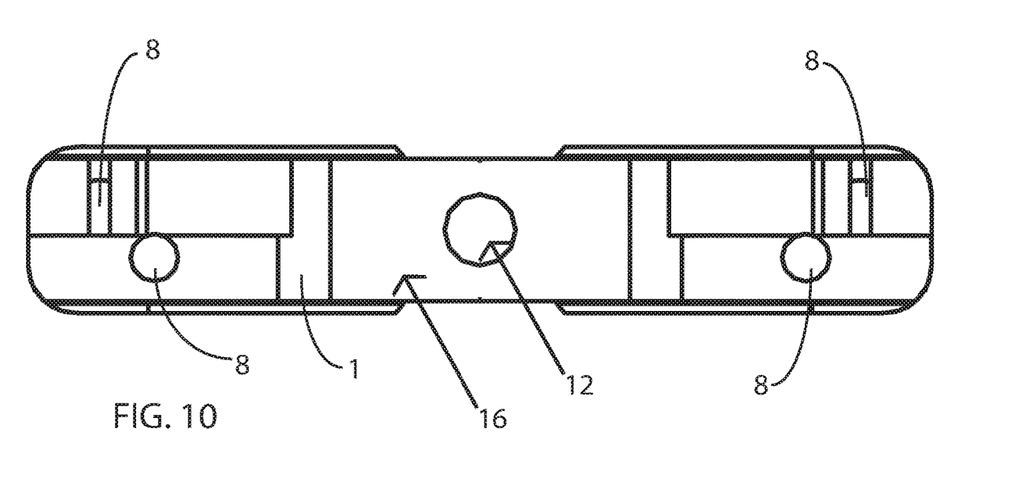
FIG. 10 is a bottom view of a fully assembled skate blade measuring apparatus in accordance with an embodiment of the invention.

The preferred skate blade measuring apparatus (21) is shown in perspective view fully assembled in FIGS. 3 and 5-10 and exploded in FIG. 4. A main body set screw (2) is inserted into main body set screw hole (3) in a main body (1). Four blade contact points (8) are inserted into the main body (1) at blade contact point holes (11). Radius magnets (9) are inserted into radius magnet alignment slots (13). Bend magnets (10) are inserted into bend magnet alignment slots (14). Main body handles (5) are installed onto main body (1). Main body handle fasteners (6) are installed through main body handle holes (7) and into main body handle fastener hole (4).

Dial indicator (17) is installed into main body (1) through main body dial indicator mount hole (12) and retained by tightening main body set screw (2). Main body dial indicator centerline marks (15) are placed on both sides of main body (1), adjacent to Dial indicator mount hole (12), to assist with locating the center line of the dial indicator tip when main body (1) is installed on a skate blade. A recessed area (16) on the bottom of the main body aids in preventing contact between the skate blade runner surface and the main body (1).

It is contemplated that the main body (1) of this embodiment be made of aluminum and Computerized Numerical Control machined from a solid block of material, but other materials and methods are also suitable including, but not limited, to alloys, plastics, composites such as carbon fiber, etc.

Likewise, it is contemplated that the handles (5) be made of plastic and solid in design, but other materials are suitable including carbon fiber, ceramic, etc. It is also contemplated that a threaded set screw (2) and threaded fastener (6) be made of steel, but other materials and fastening mechanisms also suitable.

The radius and bend magnets (9) and (10) contemplated may be made of rare earth magnets of various strengths, and shaped as squares and cylinders respectively, but other magnetic materials are also suitable, as are other shapes and magnetic strengths.

The contact points (8) contemplated may be made of carbide rod, but other materials including steel balls, gem stones, etc. are also suitable.

The width of main body (1) is contemplated to allow for contact points (8) to be spaced at 4" to allow the user to view industry standard measurements. However, a narrower width main body and contact point distance is also possible and may be desirable in some instances. Such alternate embodiments are possible and intended.

Alignment marks (15) may be etched into the aluminum surface of main body (1), but these marks can also be included by CNC machining, screen printing, surface labeling, etc., or other suitable means. Further, the alignment marks are purely for the purpose of making the process repeatable and they can be designated by other symbols as appropriate. The alignment marks may also be of any general shape or designation and may even be omitted.

In use, the blade measuring apparatus achieves its results in the following manner:

The user first calibrates the dial indicator (which may be digital or analog) (17) to read zero by placing a known flat surface against the blade contact points (8). The user then applies graduation marks to the skate blade surface to be measured to allow for alignment with main body dial indicator centerline marks (15) on main body (1).

Graduation marks on the blade surface are used to choose repeatable positions for taking measurements on the skate blade[M] and adjusting blade radius and bend using tools that are not part of the blade measuring apparatus, to achieve the user's desired result. After positioning the main body (1) onto a skate blade surface, the radius and bend can be obtained for the area located at alignment mark (15).

The user of the blade measuring apparatus can increase or decrease the magnetic attachment power of the assembled measurement apparatus by changing the strength of the installed magnets (9) and (10). The magnetic attachment power can also be adjusted by installing non-magnetic shims between the magnet (9) and/or (10) and main body (1) inside magnet alignment slots (13) and (14) to move the magnets further away from the blade surface.

Accordingly, the reader will see that the blade measuring apparatus of the various embodiments can be used to provide an easy, precise, convenient, and repeatable method to measure skate blades of various shapes and configurations, over as much, or as little, of the blades length as the user desires, that does not damage the skate blades, that is easily adjusted for measuring operation and user configuration preferences, that is easily transported, and that has an attractive appearance.

From the description above, many advantages of some embodiments of our blade measurement apparatus become evident:

(a) The construction of the main body (1) with thermally non-conductive main body handles (5) allows for reduced weight and substantially reduced possibility that extended use of the apparatus will result in the main body (1) changing shape because of the difference in temperature between the users' hand and the temperature of main body (1). As with any hand-held measurement device in the preferred environment in which this device is used, any change in the shape of main body (1) due to thermal expansion or contraction will result in inaccurate measurements.

(b) The design of main body (1) is such that the width of main body (1) and distance between blade contact points (8) can be reduced without limiting function. Such an alternate embodiment could potentially increase the accuracy of measurements taken in such a reduced size embodiment because the measurements obtained will be the result of reduced average distance between the contact points (8).

(c) The removable and replaceable magnets (9) and (10) are in positions that eliminate the possibility of blade deflection and resultant errant measurements being obtained by the dial indicator (17).

(d) The removable and replaceable magnets (9) and (10) with different magnetic strength possibilities, allow the apparatus to be tuned to the desired strength of the user without requiring the replacement of the apparatus.

(e) The removable and replaceable magnets (9) and (10), allow the apparatus to be fully disassembled and cleaned by the user, without the need for special tools.

(f) The graduation marks allow for easily repeatable bending operations.

(g) The open design of main body (1) combined with recessed area (16) allows users to work on blades easily and quickly without risk of damage to the blades surface.

(h) The shape of main body (1) and handles (5) allow for the use of a much smaller dial indicator (17) which allows for a lower center of gravity than existing designs. This allows for simpler and more precise operation as well as easier transport and less risk of damage during use. The dial is also reversible, depending upon the preferences of the operator Although the present invention has been described with reference to preferred embodiments, numerous modifications and variations can be made and still the result will come within the scope of the invention. For example, the main body can have other shapes, such as circular, trapezoidal, triangular, etc.; the handles and recesses can likewise have other shapes, etc. No limitation with respect to the specific embodiments disclosed herein is intended or should be inferred.

INDUSTRIAL APPLICABILITY

The present invention has industrial applicability in that it may be made by industry and has use in the skating industry.

The invention claimed is:

1. A skate blade measurement apparatus for the measurement of both radius of curvature and bend of a skate blade, the measurement device comprising:
   a. a one-piece main body structure;
   b. a thermally non-conductive handle assembly;
   c. with at least one removable source for a magnetic field attached to the main body structure for the purpose of exerting magnetic retention force on a skate blade;
   d. a means for measuring height, generally located in a center of the apparatus;
   e. A means for locating the main body of the apparatus on the skate blade such that is easily verified and repeatable; and
   f. at least one pair of contact points for the skate blade, one of the pair residing on each side of the means for locating the main body of the apparatus on the skate blade.

2. A skate blade measuring apparatus as recited in claim 1, further comprising a generally concave area horizontally adjacent to the blade contact points integrated into the surface of the main body, to prevent contact and damage to the skate blade.

3. A skate blade measuring apparatus as recited in claim 1, the at least one source for a magnetic field is selectable from various magnets configured, sized, and of variable magnetic strength, and said magnets are positioned to be able to impart said magnetic force in a centered orientation at the contact points along the longitudinal axis of the said skate blade.

4. A skate blade measuring apparatus as recited in claim 3, the magnets being easily interchangeable with optimally conforming strength magnetic component parts for contacting, holding, and measuring the said skate blade without changing the perceptible bend characteristics of the blade being measured.

5. A skate blade measuring apparatus as recited in claim 3, further comprising a precise position indicator such that measurements are then able to be repeatable at various locations along a blade's longitudinal axis.

6. A skate blade measuring apparatus as recited in claim 3, wherein the magnets are attached to the main body structure by an easy to operate means of insertion and removal into the main body structure.

7. A skate blade measuring apparatus as recited in claim 3, wherein the magnets may be adjusted within the installation location to increase or decrease the magnetic force applied to the blade's longitudinal axis.

\* \* \* \* \*